(12) United States Patent
Jung (10) Patent No.: US 8,446,555 B2
(45) Date of Patent: May 21, 2013

(54) FLAT PANEL DISPLAY DEVICE

(75) Inventor: Myoung-hoon Jung, Seoul (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 1301 days.

(21) Appl. No.: 11/858,384

(22) Filed: Sep. 20, 2007

(65) Prior Publication Data

US 2008/0303776 A1    Dec. 11, 2008

(30) Foreign Application Priority Data

Mar. 8, 2007    (KR) ........................ 10-2007-0022940

(51) Int. Cl.
*G02F 1/1345*    (2006.01)
(52) U.S. Cl.
USPC .......................................... 349/149; 349/151
(58) Field of Classification Search
USPC .................................. 349/139, 143, 149–152
See application file for complete search history.

(56) References Cited

U.S. PATENT DOCUMENTS

| 7,304,710 | B2 * | 12/2007 | Ishige et al. | 349/149 |
| 7,633,592 | B2 * | 12/2009 | Kobashi et al. | 349/152 |
| 2008/0013029 | A1 * | 1/2008 | Kim | 349/150 |

FOREIGN PATENT DOCUMENTS

| KR | 2004-87452 | 10/2004 |
| KR | 2004-107744 | 12/2004 |

* cited by examiner

*Primary Examiner* — Dung T. Nguyen
(74) *Attorney, Agent, or Firm* — Lee & Morse, P.C.

(57) ABSTRACT

A flat panel display device is capable of reducing a resistance difference according to the lengths of signal lines and has a stably designed resistance value of the signal lines arranged in edges of wire groups diverging from a driving circuit unit. The flat panel display device includes a display unit including a plurality of pixels arranged in intersecting regions of signal lines; a driving circuit unit to supply drive signals to the signal lines; and a divergence region having the signal lines diverge into at least two wire groups to connect the driving circuit unit to the pixels, wherein a resistance difference per unit length between the signal lines arranged in a boundary of two wire groups is set to a value that is intermediate of average resistance differences between the adjacent signal lines in the two wire groups.

25 Claims, 5 Drawing Sheets

FLAT PANEL DISPLAY DEVICE

CROSS-REFERENCE TO RELATED APPLICATION

This application claims the benefit of Korean Application No. 2007-22940, filed Mar. 8, 2007 in the Korean Intellectual Property Office, the disclosure of which is incorporated herein by reference.

BACKGROUND OF THE INVENTION

1. Field of the Invention

Aspects of the present invention relate to a flat panel display device, and more particularly to a flat panel display device capable of reducing a resistance difference arising from a difference in the lengths of signal lines and to a design of the signal lines arranged in edges of wire groups diverging from a driving circuit unit to have a stable resistance value.

2. Description of the Related Art

In recent years, there have been many attempts to develop various flat panel display devices capable of reducing weight and volume associated with a cathode ray tube, because weight and volume are problems of the cathode ray tube. The various different flat panel display devices include a liquid crystal display device, a field emission display device, a plasma display panel device, an organic light emitting display device, and other devices.

Among the various different types of flat panel display devices, the liquid crystal display device displays an image by controlling a transmission of light that is generated from an external backlight. The liquid crystal display device may display a large-area (or large-sized) image in high resolution through development of state-of-the-art display techniques. Therefore, the liquid crystal display device may be widely used in various fields.

On the other hand, the organic light emitting display device displays an image by using an organic light emitting diode that generates light by an apparatus/method of recombining electrons and holes. The organic light emitting display device has come into the spotlight as a next-generation display device since the organic light emitting display has advantages such as a rapid response time and is able to be driven to have low power consumption.

The liquid crystal display device and the organic light emitting display device include a display unit having pixels arranged in intersecting regions of scan lines and data lines and a driving circuit unit having a scan driver to supply a scan signal to the scan lines and a data driver to supply a data signal to the data lines.

In the various flat panel displays, the driving circuit unit is arranged in an edge region of a display panel having a display unit formed therein or a flexible printed circuit board connected with the display panel, for example. The driving circuit unit is connected to ends of the signal lines such as the scan lines and the data lines.

For the connection, the ends of the signal lines to be coupled to the driving circuit unit are crowded into a narrow region. On the other hand, the ends of the signal lines that are connected to the pixels are arranged at predetermined distances or intervals according to the size of the pixels of the display unit, and are therefore formed at wider distances than the ends of the signal lines that are coupled to the driving circuit unit. Accordingly, the distances between the signal lines are gradually widened like ribs of a fan in a region between the driving circuit unit and the display unit, or some of the signal lines form wire groups in regions where the signal lines diverge (hereinafter, referred to as divergence regions).

The arrangement of the signal lines in the divergence regions is such that the signal lines arranged in a central region of the divergence region extend nearly straight without a change in direction, but the signal lines near edges of the divergence region are increasingly bent at an angle as the signal lines approach the edges of the divergence region. Accordingly, the lengths of the signal lines are different depending upon a location within the divergence region, and a resistance value of each of the signal lines is varied. The difference in resistance values results in deterioration of picture quality in the flat panel display devices.

Particularly, in the case of the liquid crystal display device and the organic light emitting display device using a voltage control system to adjust and control a voltage applied to each of the pixels, the pixels receiving the same data signal will emit light with different luminances due to the resistance difference in the signal lines. The resistance difference will result in a deterioration of quality in the pictures due to a lack of precise voltage control.

SUMMARY OF THE INVENTION

Accordingly, aspects of the present invention are designed to solve such drawbacks of the related art, and an aspect of the present invention is to provide a flat panel display device capable of reducing a resistance difference arising from differences in the lengths of signal lines and to design stability into a resistance value of the signal lines arranged in edges of wire groups that diverge from a driving circuit unit.

An aspect of the present invention is achieved by providing a flat panel display device including a display unit including a plurality of pixels arranged in intersecting regions of signal lines; a driving circuit unit to supply drive signals to the signal lines; and a divergence region having the signal lines diverge into at least two wire groups to connect the driving circuit unit to the pixels, wherein a resistance difference per unit length between the signal lines arranged in a boundary of the two wire groups is set to an intermediate value between average resistance differences of the adjacent signal lines in the two wire groups.

The two wire groups are connected to adjacent pixels. A resistance difference per unit length between the signal lines arranged in the boundary of the two wire groups is a value obtained by carrying out an average operation on an average resistance difference per unit length between the adjacent signal lines in each of the wire groups including the signal lines. A resistance difference per unit length between the adjacent signal lines belonging to the same wire groups out of the signal lines in the wire groups has a constant value within the wire groups. The signal lines include scan lines and data lines to supply a scan signal and a data signal to the pixels, respectively. The driving circuit unit includes a scan driver and a data driver to supply the scan signal and the data signal to the scan lines and the data lines, respectively. Each pixel includes liquid crystal capacitors connected between the scan lines and the data lines. Each pixel includes a thin film transistor connected to the scan lines and the data lines; and a storage capacitor and a liquid crystal capacitor connected to the thin film transistor. Each pixel includes organic light emitting diodes between the scan lines and the data lines. Each pixel includes an organic light emitting diode; and a pixel circuit connected to the scan lines and the data lines to control an amount of electric current supplied to the organic light emitting diode. Each pixel circuit includes a first transistor connected to the scan lines and the data lines; a second transistor connected between the first pixel power source and the organic light emitting diode; and a storage capacitor connected between a gate electrode and a source electrode of the second transistor.

In another aspect of the present invention, a flat panel display device includes a display unit including a plurality of pixels, and a driving circuit to supply drive signals to a first wire group and a second wire group, wherein the first wire group includes a first signal line and the second wire group includes a second signal line, the first signal line has a first average resistance difference of the first wire group and the second signal line has a second average resistance difference of the second wire group, and a resistance difference per unit length between the first signal line and the second signal line is set to an intermediate value between first and second average resistance differences.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the aspects, taken in conjunction with the accompanying drawings of which.

DETAILED DESCRIPTION OF THE EMBODIMENTS

Reference will now be made in detail to the aspects of the present invention, examples of which are illustrated in the accompanying drawings, wherein like reference numerals refer to the like elements throughout. The aspects are described below in order to explain the present invention by referring to the figures.

Figure 1:
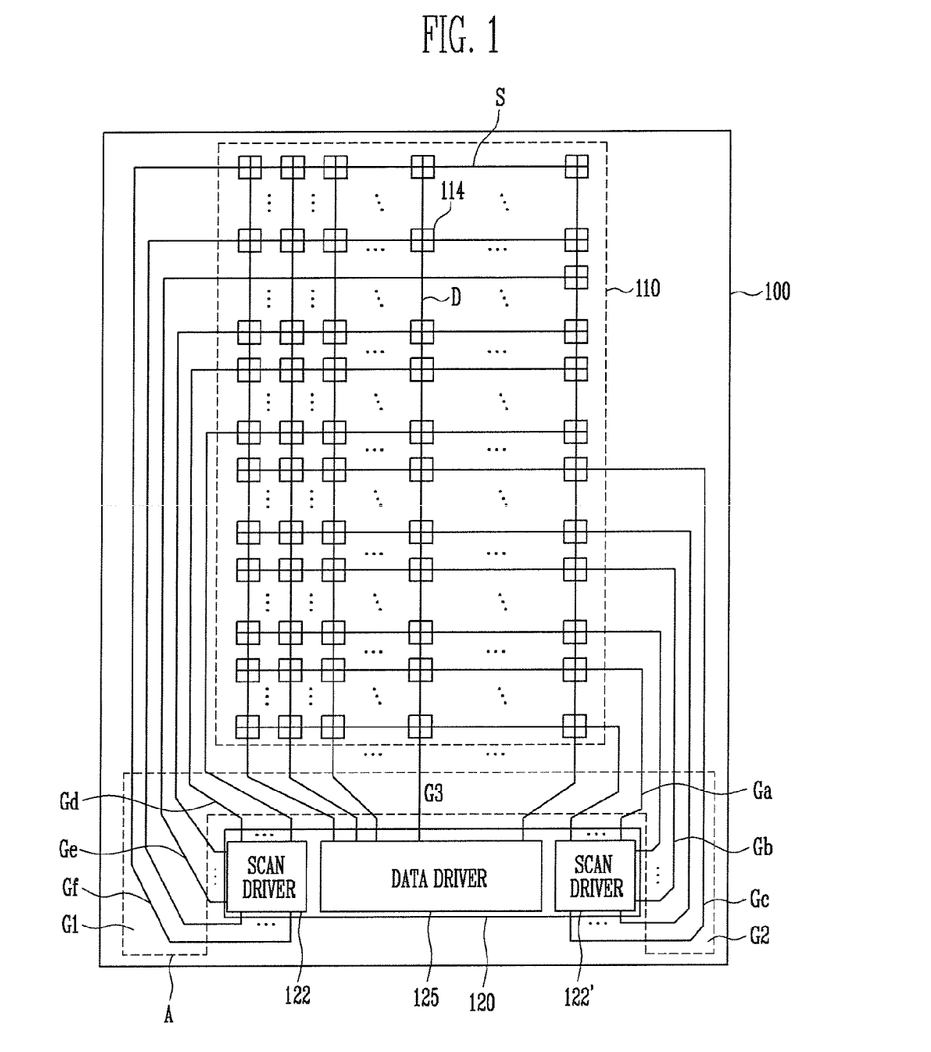
FIG. 1 is a diagram showing a flat panel display device according to an aspect of the present invention.
Figure 2:
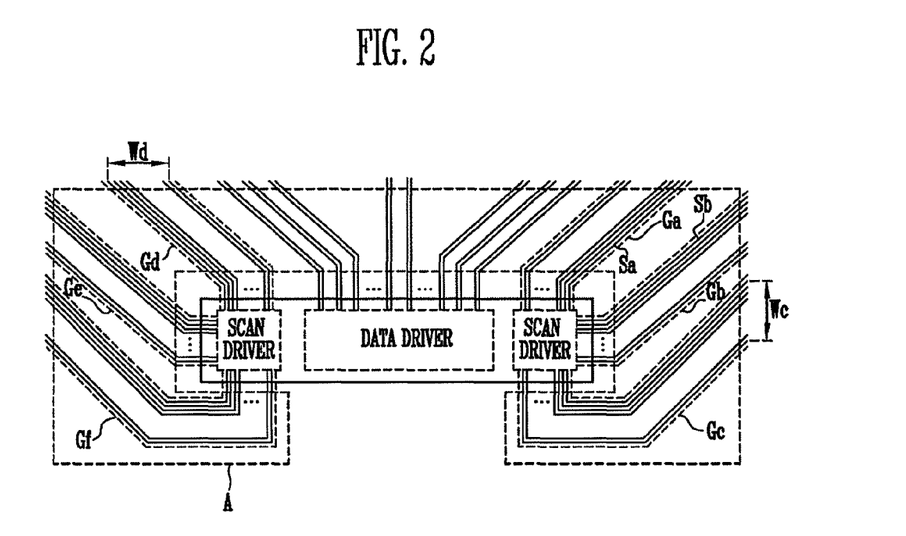
FIG. 2 is a magnified view of an arrangement showing signal lines diverging from a driving circuit unit as shown in FIG. 1.

In the aspects, when one element is described as connected to another element, the one element may be not only directly connected to the another element, but also indirectly connected to the another element via yet another element. FIG. 1 is a diagram showing a flat panel display device according to an aspect of the present invention. FIG. 2 is a magnified view of an arrangement showing signal lines diverging from a driving circuit unit shown in FIG. 1. The signal lines as shown in FIG. 1 and FIG. 2 may include signal lines to supply various signals, depending on the kind of the flat panel display devices. Hereinafter, the signal lines are discussed as scan lines and data lines of a liquid crystal display or an organic light emitting display by way of example.

Referring to FIG. 1 and FIG. 2, the flat panel display device 100 according to an aspect of the present invention includes a display unit 110 arranged in intersecting regions of signal lines (S and D) and includes a plurality of pixels 114; a driving circuit unit 120 to supply drive signals to the signal lines (S and D); and a divergence region (A) having diverging signal lines that diverge into at least two wire groups (G1 and G2) to connect the driving circuit unit 120 to the pixels 114.

The display unit 110 includes pixels 114 arranged in intersecting regions between the scan lines (S) and the data lines (D). The pixels 114 are selected by way of a scan signal supplied from the scan lines (S) to emit light corresponding to a data signal supplied from the data lines (D).

The driving circuit unit 120 includes scan drivers 122, 122' to supply the scan signal to the scan lines (S), and a data driver 125 to supply the data signal to the data lines (D). More particularly, the scan drivers 122, 122' sequentially supply the scan signal to the scan lines (S) according to a scan drive control signal supplied from a timing control unit (not shown). FIG. 1 and FIG. 2 show two scan drivers 122, 122' provided on opposite sides of the data driver 125, for example. However, aspects of the present invention are not limited thereto. For example, one scan driver may supply a scan signal to all of the scan lines (S). Similarly, in other aspects, more than one data driver 125 may be provided to supply the data signal to the data lines (D).

In the aspect shown, the data driver 125 generates the data signal to correspond to a data drive control signal and a data supplied from the timing control unit. The data signal generated by the data driver 125 is supplied to the data lines (D) and transmitted to the pixels 114 so as to synchronize with the scan signal.

For this purpose, the driving circuit unit 120 is commonly connected to ends of the scan lines (S) and the data lines (D). However, the driving circuit unit 120 is generally arranged to one side edge of the display panel 100 having the display unit 110 formed therein (e.g., on lower portion as shown in FIG. 1), or arranged in a flexible printed circuit board (not shown) connected to the display panel 100 through a pad portion (not shown), for example.

Accordingly, ends of the scan lines (S) and the data lines (D) are made compact (or crowded) into a narrow region, and then connected to the driving circuit unit 120 as shown in FIG. 1. On the other hand, in ends of the scan lines (S) and the data lines (D) connected to the pixels 114, each of the scan lines (S) and the data lines (D) are maintained at distances that are set according to sizes of the pixels 115, and therefore the distances between the adjacent scan lines (S) and/or data lines (D) are formed to be wider than those of the ends of the scan lines (S) and the data lines (D) coupled to the driving circuit unit 120. In other words, one end of the signal lines (S and D) are spaced narrower from each other, while the other end of the signal lines are spaced wider from each other.

Therefore, the distances between the scan lines (S) and/or the data lines (D) are gradually widened like ribs of a fan in a region of the display panel 100 lying between the display unit 110 and the driving circuit unit 120, or some of signal lines (S) and the data lines (D) form wire groups (G1, G2) in region (A)

to diverge away from the driving circuit unit 120. That is, the scan lines (S) and/or the data lines (D) diverge into at least two wire groups (G1, G2) in the divergence regions (A).

More particularly, the signal lines arranged in a central region of the divergence region (A), extend nearly straight without the change in directions. As shown in FIG. 1, for example, the data lines (D) connected to the pixels 115 arranged in the central region of the display unit 110 are arranged to extend nearly straight. On the other hand, the signal lines (S) near or toward edges of the divergence region (A) are increasingly bent at an angle as the signal lines approach (or are located more towards) the edges of the divergence region (A). As shown in FIG. 1, the outermost signals lines (S) are bent extremely and even loop around the scan driver 122.

Particularly, referring to FIG. 2, the scan lines (S) arranged in the edge of the divergence region (A) have lengths that are different due to the differing bending angles for each different wire group (Ga, Gb, Gc), and the lengths of some of the scan lines (S) are longer even in the same wire groups (Gb, Gc) as the signal lines approach (or are located more towards) the edge of the divergence region (A) (such as Gc).

Accordingly, the flat panel display device that uses a voltage control system to adjust and control a voltage applied to each of the pixels will receive a different voltage for the pixels 114 for the same data signal. The different applied voltages will cause the emission of light with different luminances since the resistance value is different due to the length difference in the signal lines, resulting in deterioration of picture quality.

For example, in the liquid crystal display device or organic light emitting display device that uses a voltage drive system, a voltage may decrease while the signal is supplied due to the differences in the resistance of the signal lines, even though the scan signal and/or the data signal have the same voltage level as originally supplied to the scan lines (S) and/or the data lines (D). Accordingly, the pixels 114 may emit light with different luminances since the voltage level of the scan signal and/or the data signal that is actually supplied to or reach the pixels 114 differs. As a result, quality of an image displayed in the display unit 110 may deteriorate.

In aspects of the present invention, to prevent or reduce the deterioration in the quality of the image, an equivalent resistance design arrangement is used so that the signal lines can have similar resistance values by way of controlling a line width, or other parameters, according to the lengths of the signal lines that diverge from the divergence region (A). For example, the scan lines (S) and/or the data lines (D) may be formed to have a similar (ideally identical) resistance value by controlling the line width so that a value obtained by dividing the lengths of the signal lines by the line width of the signal lines can be a constant value. In controlling the line width, for example, resistance values of some signal lines, particularly the signal lines arranged in the edges of the wire groups (G1, G2), are designed so that the resistance values can be prevented or reduced from being unstable (or inconsistent). This detailed description thereof will be illustrated later with reference to FIG. 3 and FIG. 4. In various aspects, other parameters of the signal lines such as the thickness and/or resistivity may be controlled to obtain a consistent or equivalent resistance of the signal lines.

Figure 3:
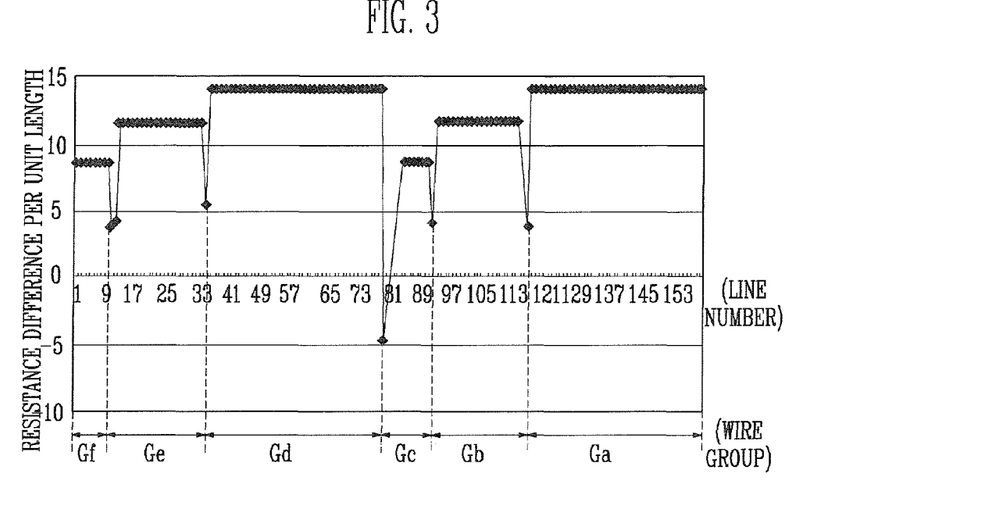
FIG. 3 is a graph showing a resistance difference per unit length between the signal lines as shown in FIG. 2 if the signal lines are formed according to an aspect of the present invention.
Figure 4:
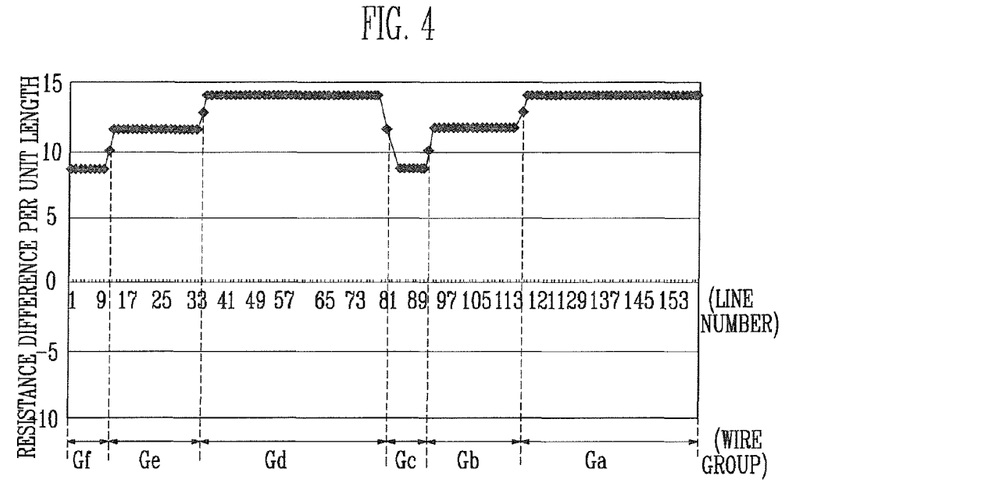
FIG. 4 is a graph showing a resistance difference per unit length between the signal lines as shown in FIG. 2 if the signal lines are formed according to another aspect of the present invention.

FIG. 3 is a graph showing a resistance difference per unit length between the signal lines as shown in FIG. 2 if the signal lines are formed according to an aspect of the present invention. FIG. 4 is a graph showing a resistance difference per unit length between the signal lines as shown in FIG. 2 if the signal lines are formed according to another aspect of the present invention. Hereinafter, the equivalent resistance design arrangement will be described in greater detail with reference to FIG. 3 and FIG. 4 with FIG. 2, in consideration of the length differences of the signal lines.

Referring to FIG. 3 and FIG. 4, to compensate for the resistance difference of the signal lines, widths of the signal lines are set (or controlled) in the present invention considering the lengths of the signal line. Accordingly, resistance values per unit length are differently set in one or more of the signal lines.

In this aspect, among the signal lines belonging to various wire groups (G1, G2), namely (a "Ga" wire group to a "Gf" wire group), the signal lines belonging in the same wire groups are arranged at an approximately constant distance (or a close interval). Accordingly, resistance differences per unit length between adjacent signal lines that belong to the same wire groups are small for the adjacent signal lines. Accordingly, the adjacent signal lines have an effectively constant value within each wire group, as shown in FIG. 3. In this aspect, the G1 wire group includes Gd, Ge, and Gf wire groups, and the G2 wire group includes Ga, Gb, and Gc wire groups.

Additionally, in the signal lines formed the edges of each wire group (G1, G2) may be formed with consideration for the lengths and widths of the signal lines so that resistance ratios of the edge signal lines are within a constant or a particular range for the purpose of the equivalent resistance design arrangement. For example, a signal line (Sa, hereinafter referred to as a first signal line) formed in an edge of the "Ga" wire group and a signal line (Sb, hereinafter referred to as a second signal line) formed in an edge of the "Gb" wire group may be formed so that an entire resistance ratio of the first signal line and the second signal line can be 0.99~1.01:1.

However, if the widths of the signal lines are varied to correspond to the lengths thereof, since the length differences of the signal lines are high (or large) between the wire groups (G1, G2, as wells as Ga to Gf), adjusting the resistance ratio within the range increases the amount of variance in the width control of the signal lines. As a result, a deviation of the difference in resistance per unit length is increased in boundary regions of the wire groups, resulting in unstable (or inconsistent) resistance values of the signal lines, as shown in FIG. 3.

Particularly, in the "Gc" wire group and the "Gd" wire group, for example, line widths of the signal lines are set to have a relatively large line width deviation arising from differences in length of the signal lines between the two wire groups (Gc, Gd) due to different paths formed for the signal lines thereof (as shown in FIG. 1). That is, the deviation due to resistance differences per unit length between the two wire groups (G1, G2) is different, but the signal lines arranged in the boundary of the two wire groups (G1, G2) are connected to adjacent pixels 114. Therefore, picture quality may deteriorate since line blots may occur in the display unit 110.

Accordingly, to prevent or reduce the deterioration of picture quality, the resistance difference per unit length between the signal lines arranged in the edges of the wire groups (G1, G2) (namely, the boundary between the wire groups) may be set by averaging an intermediate value of an average resistance difference between the adjacent signal lines in the two wire groups (G1, G2) that are connected respectively to the adjacent pixels 114, e.g., to particularly an average resistance difference of the two wire groups (Gc, Gd) that are connected to adjacent pixels 114 along a vertical direction, as shown in FIGS. 1 and 4. For example, referring to FIG. 2, a width We of the wire group Gc may be controlled to be different than a width Wd of the wire group Gd, so the value obtained by dividing the lengths of the signal lines in the wire groups (Gc, Gd) by the respective widths of the signal lines in the wire groups (Gc, Gd) can be a constant value. In various aspects, the resistance difference per unit length between the signal lines arranged in the edges within the wire group (such as G1) may be set by averaging an intermediate value of an average resistance difference between the adjacent signal lines in the two wire groups (Ge, Gd, for example) within the same wire group (G1).

As described above, the deviation in resistance may be reduced by setting the resistance differences between the signal lines, that are arranged in the edges of the two wire groups (G1, G2) connected to the adjacent pixels 115, to an intermediate value of the average resistance difference of each of the wire groups (G1, G2) to which the signal lines belong.

As described above, the flat panel display device according to an aspect of the present invention may be useful to reduce the resistance difference resulting from the length differences of the signal lines, and also to improve the picture quality by designing the resistance values of the signal lines arranged in the edge of the wire groups (G1, G2) to be stable.

Also, in order to adjust the total resistance ratios of the signal lines formed in the edges of the wire groups (G1, G2) within a constant or a particular range, the resistance difference between the two adjacent wire groups (G1, G2) is set by averaging the resistance differences in the wire groups (G1, G2) without calculating all of the resistance ratios of the signal lines, to result in simplicity in handling and an increase in design efficiency.

Figure 5:
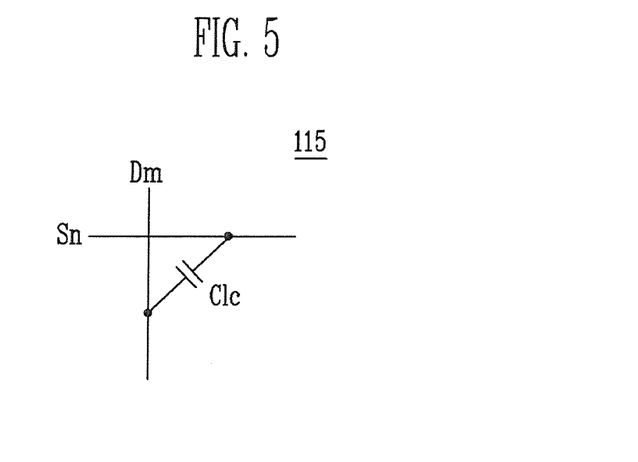
FIG. 5 is a circuit view showing an aspect of the pixel as shown in FIG. 1 if the flat panel display device as shown in FIG. 1 is a passive liquid crystal display device.

FIG. 5 is a circuit view showing an aspect of the pixel as shown in FIG. 1 if the flat panel display device as shown in FIG. 1 is a passive liquid crystal display device. For sake of convenience of description, a pixel is connected to an $n^{th}$ scan line (Sn) and an $m^{th}$ data line (Dm), as shown in FIG. 5.

Referring to FIG. 5, a pixel 115 includes a liquid crystal capacitor (Clc) connected between the scan lines (Sn) and the data lines (Dm). The liquid crystal capacitor (Clc) serve to display a generalized liquid crystal between the scan lines (Sn) and the data lines (Dm). Such a liquid crystal capacitor (Clc) controls optical transmittance of the liquid crystal to correspond to a voltage difference supplied to the scan lines (Sn) and the data lines (Dm).

If the flat panel display device as shown in FIG. 1 is provided with the pixels 115 of FIG. 5, the flat panel display device may include a lower substrate having data lines (D) and a driving circuit unit 120 formed therein; an upper substrate having scan lines (S) formed therein, the scan lines (S) being connected with the driving circuit unit 120 of the lower substrate through a pad portion (not shown); and a liquid crystal layer (not shown) injected between the lower substrate and the upper substrate.

Figure 6:
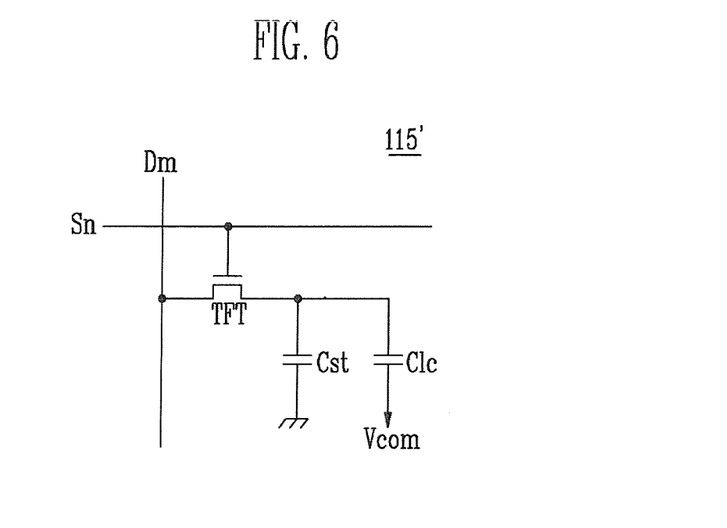
FIG. 6 is a circuit view showing an aspect of the pixel as shown in FIG. 1 if the flat panel display device as shown in FIG. 1 is an active liquid crystal display device.

FIG. 6 is a circuit view showing an aspect of the pixel as shown in FIG. 1 if the flat panel display device as shown in FIG. 1 is an active liquid crystal display device. For sake of convenience of description, the pixel is connected with an $n^{th}$ scan line (Sn) and an $m^{th}$ data line (Dm), as shown in FIG. 6. Referring to FIG. 6, the pixel 115' includes a thin film transistor (hereinafter, referred to as a TFT) connected to the scan lines (Sn) and the data lines (Dm); a storage capacitor (Cst) and a generalized liquid crystal capacitor (Clc) connected to the TFT respectively.

A first electrode of the TFT is connected to the data lines (Dm), and a second electrode is connected to one electrode of the storage capacitor (Cst) and the liquid crystal capacitor (Clc). As shown, the first electrode and the second electrode of the TFT are different electrodes. For example, the second electrode is a source electrode if the first electrode is a drain electrode. Also, a gate electrode of the TFT is connected to the scan lines (Sn). Such a TFT is turned off when a scan signal is supplied to the scan lines (Sn) to thereby supply the data signal from the data lines (Dm) to the storage capacitor (Cst).

The storage capacitor (Cst) stores a voltage corresponding to the data signal supplied via the TFT, and sustains the stored voltage during one frame period. The liquid crystal capacitor (Clc) serves to display a generalized liquid crystal between a pixel electrode (not shown) and a common electrode (not shown) which are connected to the second electrode of the TFT. Such a liquid crystal capacitor (Clc) controls optical transmittance of the liquid crystal to correspond to the voltage stored in the storage capacitor (Cst).

The configuration of the pixel 115' as shown in FIG. 6 is one aspect of the present invention and not limiting. In various aspects, the configuration of the pixel 115' is variable so that in other aspects, the pixel 115' can have at least one TFT, and possibly more. If the flat panel display device as shown in FIG. 1 is provided with the pixels 115', the flat panel display device may include a lower substrate having a plurality of data lines (D) a scan line (S), a TFT, a storage capacitor (Cst), a pixel electrode of the liquid crystal capacitor (Clc) and the driving circuit unit 120, which are formed therein; an upper substrate having a common electrode of the liquid crystal capacitor (Clc) formed therein; and a liquid crystal layer (not shown) injected between the pixel electrode and the common electrode.

Figure 7:
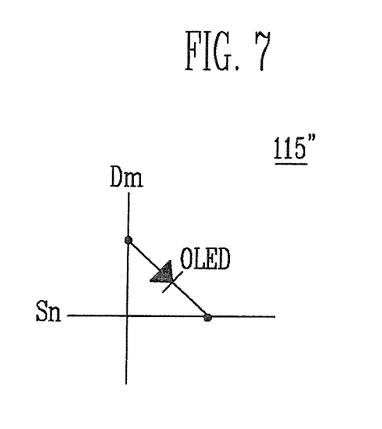
FIG. 7 is a circuit view showing an aspect of the pixel as shown in FIG. 1 if the flat panel display device as shown in FIG. 1 is a passive organic light emitting display device.

FIG. 7 is a circuit view showing an aspect of the pixel as shown in FIG. 1 if the flat panel display device as shown in FIG. 1 is a passive organic light emitting display device. For sake of convenience of description, the pixel is connected with an $n^{th}$ scan line (Sn) and an $m^{th}$ data line (Dm), as shown in FIG. 7. Referring to FIG. 7, the pixel 115" includes an organic light emitting diode (OLED) connected to the scan lines (Sn) and the data lines (Dm). Such an organic light emitting diode (OLED) is selected by the scan signal supplied from a cathode electrode of the organic light emitting diode (OLED) to generate light with luminances that correspond to the data signal supplied to an anode electrode of the organic light emitting diode (OLED). If the flat panel display device as shown in FIG. 1 is provided with the pixels 115", the flat panel display device may include a lower substrate having scan lines (S), data lines (D), organic light emitting diodes (OLED) and the driving circuit unit 120, which are formed therein; and an upper substrate formed to seal the display unit 110 having the organic light emitting diodes (OLED) formed therein.

Figure 8:
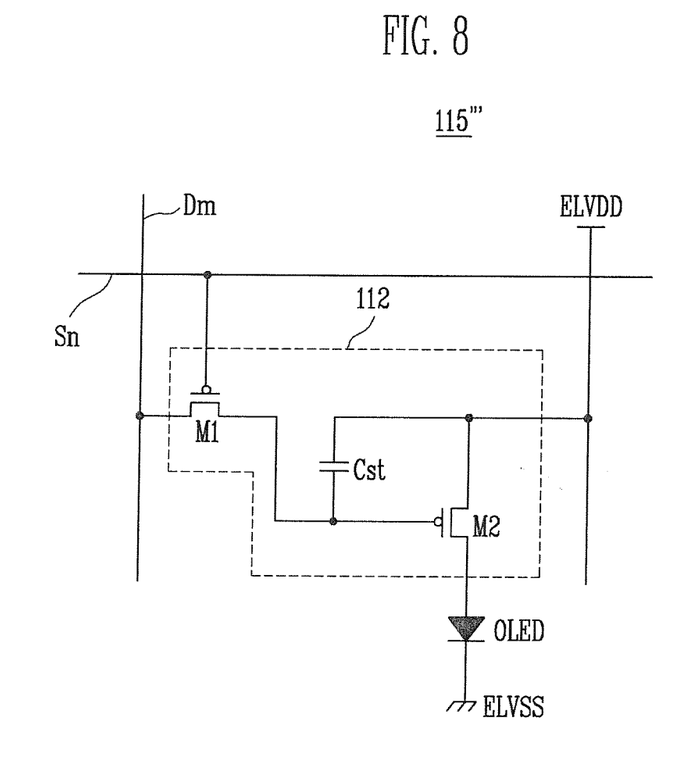
FIG. 8 is a circuit view showing an aspect of the pixel as shown in FIG. 1 if the flat panel display device as shown in FIG. 1 is an active organic light emitting display device.

FIG. 8 is a circuit view showing an aspect of the pixel as shown in FIG. 1 if the flat panel display device as shown in FIG. 1 is an active organic light emitting display device. For sake of convenience of description, the pixel is connected with an $n^{th}$ scan line (Sn) and an $m^{th}$ data line (Dm), as shown in FIG. 8. Referring to FIG. 8, the pixel 115''' includes an organic light emitting diode (OLED); and a pixel circuit 112 connected to the data lines (Dm) and the scan lines (Sn) to control the organic light emitting diode (OLED).

An anode electrode of the organic light emitting diode (OLED) is connected to the pixel circuit 112, and a cathode electrode is connected to the second pixel power source (ELVSS). Such an organic light emitting diode (OLED) generates light with predetermined luminances that correspond to an electric current supplied from the pixel circuit 112. When the scan signal is supplied to the scan lines (Sn), the pixel circuit 112 controls an amount of the electric current supplied to the organic light emitting diode (OLED) to correspond to the data signal supplied from the data lines (Dm).

For this purpose, the pixel circuit 112 includes a first transistor (M1) connected to the scan lines (Sn) and the data lines (Dm); a second transistor (M2) connected between the first pixel power source (ELVSS) and the anode electrode of the organic light emitting diode (OLED); and a storage capacitor (Cst) connected between a gate electrode and a source electrode of the second transistor (M2).

A first electrode of the first transistor (M1) is connected to the data lines (Dm), and a second electrode of the first transistor (M1) is connected to a gate electrode of the second transistor (M2) and one electrode of the storage capacitor. As shown, a first electrode and a second electrode of the first transistor (M1) are different electrodes. For example, the second electrode is a drain electrode if the first electrode is a source electrode. Also, a gate electrode of the first transistor (M1) is connected to the scan lines (Sn). When the scan signal is supplied from the scan lines (Sn), the first transistor (M1) is turned on to supply the data signal from the data lines (Dm) to the storage capacitor (Cst). At this time, the storage capacitor (Cst) is charged with a voltage corresponding to the data signal.

A first electrode of the second transistor (M2) is connected to the first pixel power source (ELVDD), and a second electrode is connected to the anode electrode of the organic light emitting diode (OLED). Also, a gate electrode of the second transistor (M2) is connected to one electrode of the storage capacitor (Cst). The second transistor (M2) controls an amount of the electric current flowing from the first pixel power source (ELVDD) to the second pixel power source (ELVSS) via the organic light emitting diode (OLED) to correspond to a voltage value stored in the storage capacitor (Cst). At this time, the organic light emitting diode (OLED) generates light that corresponds to the amount of the electric current supplied from the second transistor (M2). Meanwhile, the configuration of the pixel 115''' as shown in FIG. 8 is one aspect of the present invention, but is not limited thereto. In various aspects, the configuration of the pixel 115''' may be varied so that the pixel 115''' can have a plurality of transistors.

If the flat panel display device as shown in FIG. 1 is provided with the pixels 115''', the flat panel display device may include a display unit 110 having scan lines (S), data lines (D), and pixels 115''' which are formed therein; a lower substrate having a driving circuit unit 120 formed therein; and an upper substrate formed to seal the display unit 110.

As described above, the flat panel display device according to aspects of the present invention may be useful to reduce the resistance difference by controlling a line width according to the lengths of the signal lines, and to also improve the quality of the pictures by designing the resistance values of the signal lines arranged in the edge of the wire groups to have stability.

Also, in order to adjust the total resistance ratios of the signal lines formed in the edges of the wire groups within a constant or a particular range, the resistance difference between two adjacent wire groups is set by averaging the resistance differences in the wire groups without calculating all of the resistance ratios of the signal lines, to result in simplicity in handling and increase in design efficiency.

In various aspects, and/or and at least one refers to any one or any combination of the stated elements.

Although a few aspects of the present invention have been shown and described, it would be appreciated by those skilled in the art that changes may be made in the aspects without departing from the principles and spirit of the invention, the scope of which is defined in the claims and their equivalents.

What is claimed is:

1. A flat panel display device, comprising:
    a display unit including a plurality of pixels arranged in intersecting regions of signal lines;
    a driving circuit unit to supply drive signals to the signal lines; and
    a divergence region having the signal lines diverge into at least two wire groups to connect the driving circuit unit to the pixels, widths of signal lines in each wire group being adjusted in accordance with corresponding signal lines lengths to provide a substantially constant average resistance within each wire group,
    wherein a width of an outermost signal line in each wiring group is adjusted in accordance with a width of an outermost signal line of an adjacent wiring group, such that an average resistance value of the two outermost signal lines is an intermediate resistance value between average resistance values of the two adjacent wiring groups.

2. The flat panel display device according to claim 1, wherein the two wire groups are connected to adjacent pixels, respectively.

3. The flat panel display device according to claim 1, wherein a resistance difference per unit length between the two outermost signal lines of the two adjacent wire groups is a value obtained by carrying out an average operation on an average resistance difference per unit length between the adjacent signal lines in each of the wire groups including the signal lines.

4. The flat panel display device according to claim 1, wherein a resistance difference per unit length between adjacent signal lines within a same wire group has a constant value.

5. The flat panel display device according to claim 1, wherein the signal lines include scan lines and data lines to supply a scan signal and a data signal to the pixels, respectively.

6. The flat panel display device according to claim 5, wherein the driving circuit unit includes a scan driver and a data driver to supply the scan signal and the data signal to the scan lines and the data lines, respectively.

7. The flat panel display device according to claim 5, wherein the pixel includes liquid crystal capacitors connected between the scan lines and the data lines.

8. The flat panel display device according to claim 5, wherein the pixel comprises:
    a thin film transistor connected to the scan lines and the data lines; and
    a storage capacitor and a liquid crystal capacitor connected to the thin film transistor.

9. The flat panel display device according to claim 5, wherein the pixel includes organic light emitting diodes between the scan lines and the data lines.

10. The flat panel display device according to claim 5, wherein the pixel comprises:
    an organic light emitting diode; and
    a pixel circuit connected to the scan lines and the data lines to control an amount of electric current supplied to the organic light emitting diode.

11. The flat panel display device according to claim 10, wherein the pixel circuit comprises:
    a first transistor connected to the scan lines and the data lines;
    a second transistor connected between the first pixel power source and the organic light emitting diode; and
    a storage capacitor connected between a gate electrode and a source electrode of the second transistor.

12. The flat panel display device of claim 1, wherein the two outermost signal lines of the adjacent wiring groups are adjacent each other.

13. The flat panel display device of claim 12, wherein the two outermost signal lines of the adjacent wiring groups are connected to adjacent pixels.

14. The flat panel display device of claim 1, wherein each wire group includes a plurality of signal lines, distances between adjacent signal lines within each wire group being substantially small to provide substantially same signal line lengths.

15. The flat panel display device of claim 14, wherein each wire group is spaced apart from an adjacent wire group, the outermost signal line in each wire group having its width adjusted in accordance with the average resistance within its wire group and in accordance with the intermediate resistance value.

16. A flat panel display device, comprising:
a display unit including a plurality of pixels; and
a driving circuit to supply drive signals to a first wire group and a second wire group,
wherein the first wire group includes a first signal line and the second wire group includes a second signal line, the first signal line has a first average resistance difference of the first wire group and the second signal line has a second average resistance difference of the second wire group, and
wherein the first and second signal lines are designed to have predetermined widths and/or lengths, the predetermined widths and/or lengths providing a resistance difference per unit length between the first signal line and the second signal line that is an intermediate value between the first and second average resistance differences.

17. The flat panel display device of claim 16, wherein the resistance difference per unit length between the first signal line and the second signal line is set by adjusting the first average resistance difference of the first wire group and/or the second average resistance difference of the second wire group.

18. The flat panel display device of claim 16, wherein the first signal line and the second signal line are adjacent on the flat panel display.

19. The flat panel display device of claim 16, further comprising a divergence region having the first and second wire groups diverge to form a matrix of the pixels.

20. The flat panel display device of claim 16, wherein the first wire group and the second wire group each includes a plurality of signal lines, the signal lines in each wire group each has a length and a width, and the widths of the signal lines in each wire group is varied relative to their lengths so that the signal lines in the same wire group have similar resistance values.

21. The flat panel display device of claim 16, wherein the device is an active or passive matrix device.

22. The flat panel display device of claim 16, wherein the device is a liquid crystal display or organic light emitting diode device.

23. The flat panel display device of claim 16, wherein the resistance difference per unit length between the first signal line and the second signal line is set by averaging resistance differences in the first and the second wire groups without calculating resistance ratios of signal lines in the first wire group and the second wire group.

24. The flat panel display device of claim 16, further comprising a pixel circuit in each of the pixels.

25. The flat panel display device of claim 16, wherein the pixel circuit includes one of a liquid crystal capacitor, a thin film transistor, or an organic light emitting diode.

* * * * *